(12) United States Patent
Schleipen

(10) Patent No.: US 6,278,538 B1
(45) Date of Patent: Aug. 21, 2001

(54) OPTICAL SCANNER

(75) Inventor: Johannes J. H. B. Schleipen, Eindhoven (NL)

(73) Assignee: U.S. Philips Corporation, New York, NY (US)

( * ) Notice: Subject to any disclaimer, the term of this patent is extended or adjusted under 35 U.S.C. 154(b) by 0 days.

(21) Appl. No.: 09/076,500

(22) Filed: May 12, 1998

(30) Foreign Application Priority Data

May 16, 1997 (EP) .................................................. 97201476

(51) Int. Cl.$^7$ ............................................ G02B 26/08
(52) U.S. Cl. .................. 359/201; 359/202; 359/203; 359/212; 359/226; 359/368; 359/17; 345/7; 347/260; 235/457; 235/463; 235/467; 235/470
(58) Field of Search ............................ 359/17, 201, 202, 359/212, 368, 369, 630–633, 203, 226, 569, 572; 235/462, 463, 467, 470, 457; 345/7; 347/256–260

(56) References Cited

U.S. PATENT DOCUMENTS

| | | | |
|---|---|---|---|
| 5,189,533 | * | 2/1993 | Taguchi et al. .......................... 359/17 |
| 5,204,523 | * | 4/1993 | Appel et al. .......................... 250/236 |
| 5,333,144 | | 7/1994 | Liedenbaum et al. .................. 372/29 |
| 5,545,886 | * | 8/1996 | Metlisky et al. ...................... 235/462 |
| 5,768,001 | * | 6/1998 | Kelley et al. ......................... 359/196 |

FOREIGN PATENT DOCUMENTS

| | | |
|---|---|---|
| 0517517A1 | 9/1992 | (EP) ................................ H04N/9/31 |
| 62-56931A | 3/1987 | (JP) . |

OTHER PUBLICATIONS

J.P.H. Benchop, "Signal Detection and Interpretation in Scanning Optical Microscopy" May 1989.*

* cited by examiner

*Primary Examiner*—James Phan

(57) ABSTRACT

The present invention relates to an optical scanner (20) comprising a radiation source (24) for generating a radiation beam, and means (22), (26) for giving the radiation beam a scanning movement in a first direction through an angular range $\Delta\theta_1$ and in a second direction through an angular range $\Delta\theta_2$. The radiation source (24) is, for example a diode laser and is tunable in wavelength, and the means comprise a rotating reflecting element and a grating.

13 Claims, 10 Drawing Sheets

OPTICAL SCANNER

The invention relates to an optical scanner comprising a radiation source for generating a radiation beam, and means for giving the radiation beam a scanning movement in a first direction through an angular range $\Delta\theta_1$, and in a second direction through an angular range $\Delta\theta_1$.

The invention also relates to a plurality of applications in which use is made of such an optical scanner.

A scanner of the type described in the opening paragraph is used in, for example, an optical scanning microscope. Such a microscope is described in, for example, the thesis: "Signal detection and interpretation in scanning optical microscopy" by J.P.H. Benschop. In the microscope described in this thesis, a point source is imaged on an object by means of an objective lens. The scanning movement of the beam is realized by means of a combination of two mirrors. The mirrors are positioned with respect to each other in such a way that each mirror reflects the light incident thereon at substantially right angles. A small tilt of the mirrors is converted into an angular variation in the direction of propagation of the light beam. A telescope, i.e. a set of two lenses, is arranged between the two mirrors and ensures that the mirrors are imaged on each other in order to realize a two-dimensional scanning movement starting from one point.

Drawbacks of the scanner described here are the relatively low scanning rate caused by the two mechanical rotations of the mirrors and the presence of the telescope, which does not contribute to the compactness of the system.

It is an object of the present invention to provide an optical scanner which is compact and with which relatively high scanning rates can be achieved.

To this end, the optical scanner according to the invention is characterized in that the radiation source is tunable in wavelength, and the means comprise a grating and a rotating reflecting element.

The scanning movement through one angular range is realized by rotating the reflecting element. The scanning movement through the other angular range is realized by varying the wavelength of the laser. In fact, the deflection on the grating is dependent on the wavelength of the incident light. In this way, a wavelength scan is converted into an angular scan.

In each scanning movement which is based on a mechanical movement, the scanning rate will be limited due to the inertia of this mechanical movement. Since a two-dimensional scanning movement is realized in this case by means of only one mechanical movement, it is possible to realize a scanning rate which is higher than that realized in the case of two mechanical movements. In fact, the limitation of the scanning rate due to the wavelength modulation technique is considerably smaller than the limitation due to a mechanical movement.

A preferred embodiment of the optical scanner according to the invention is characterized in that the reflecting element and the grating are integrated with each other.

This has the advantage that, instead of two points of rotation, namely one for each reflecting element and the lenses required therefor, only one point of rotation is present in this embodiment according to the present invention, and these lenses can be dispensed with. This also means that the system can be given a considerably more compact form.

Moreover, the number of separate components is reduced. The rotation of the element about an axis perpendicular to the grating lines and situated in the plane of the grating will not have any influence on the effect of the grating on the incident beam. The grating only has effect on the scanning movement when the wavelength of the incident beam varies. Thus, the two scanning movements are not coupled.

A further embodiment of the optical scanner according to the invention is characterized in that the laser is a pulsed diode laser.

By making use of a pulsed laser beam, depth information can be obtained. The distance between the laser and an object can be determined in any arbitrary direction by registering the instant when the reflected laser pulse echo is detected. Two angle co-ordinates and one position co-ordinate are thus scanned on the basis of one scanning angle, a wavelength scan and a time measurement. This embodiment of the optical scanner is very suitable in, for example applications in which objects are scanned, and in an optical scanning microscope.

The rate of the wavelength scan is not influenced by the inertia of a mechanical rotation in the optical scanner according to the invention. The mechanical movement yields scanning rates up to approximately 1 kHz in one direction, while scanning rates of approximately 100 kHz can be realized with the wavelength scan in the other direction.

The optical scanner described above may be used to great advantage in a plurality of applications which will hereinafter be described in greater detail.

These and other aspects of the invention are apparent from and will be elucidated with reference to the embodiments described hereinafter.

Figure 6A:
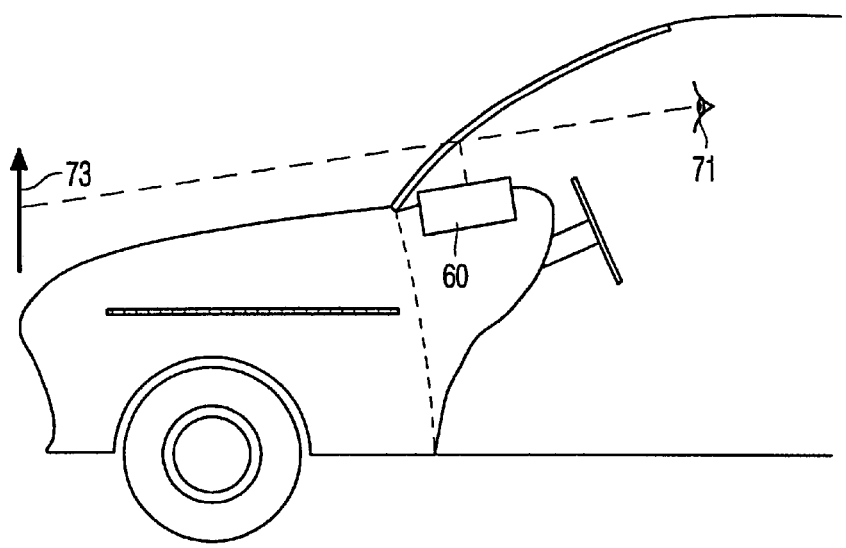
Figure 8:
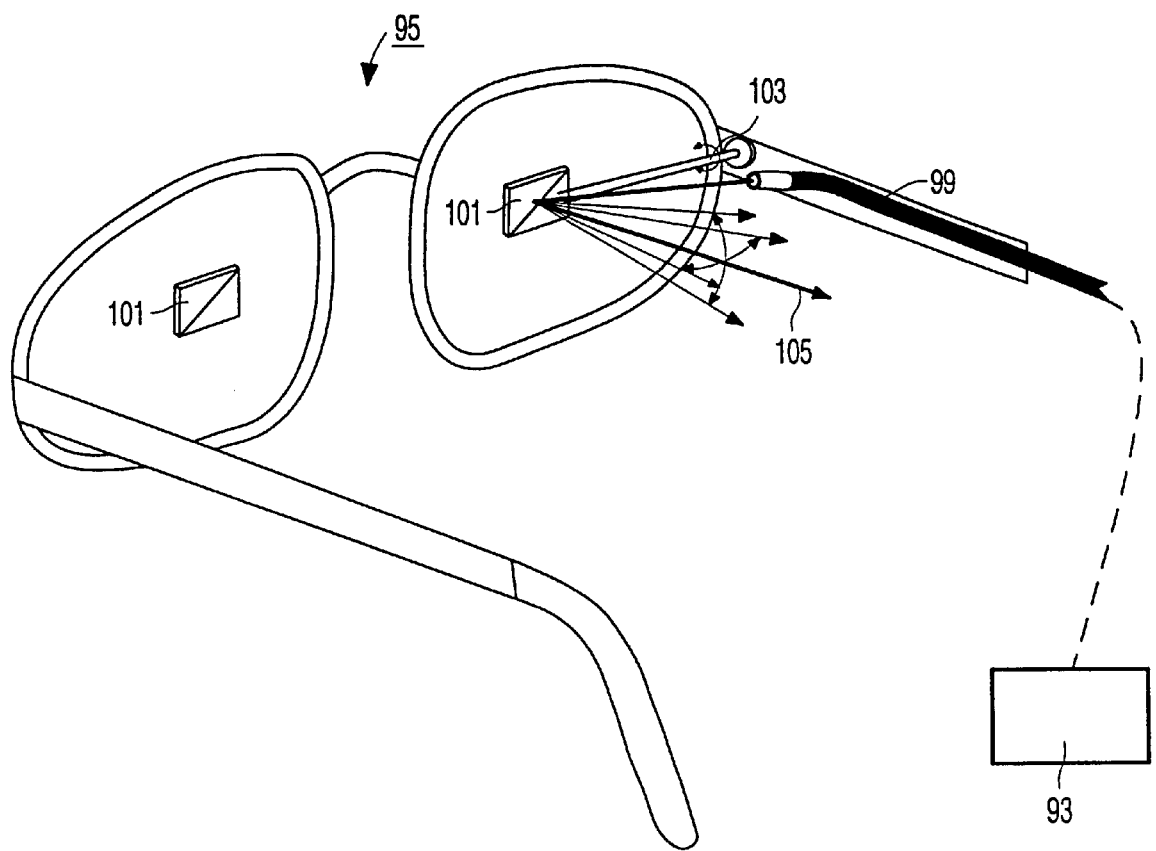
Figure 6B:
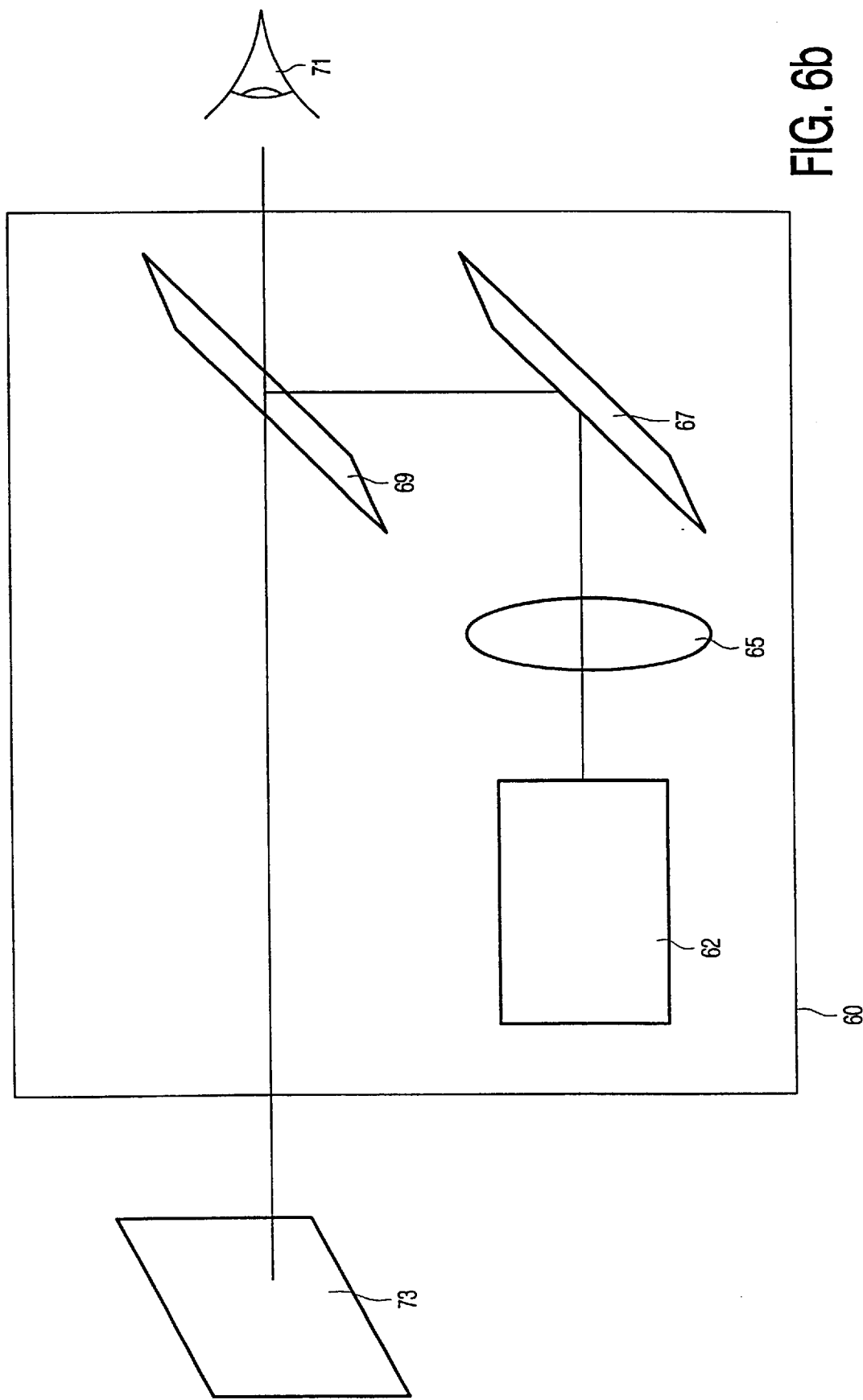
Figure 7:
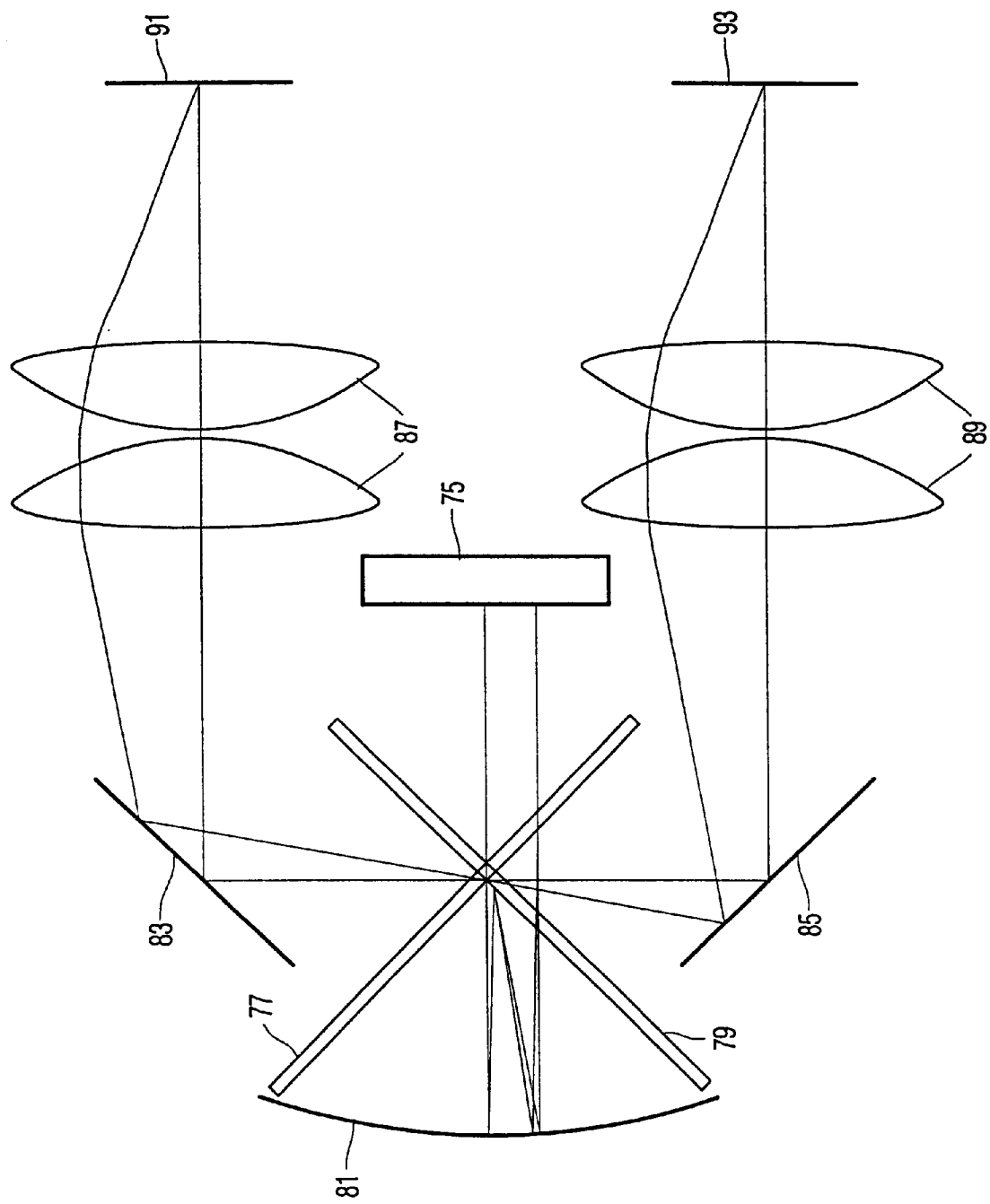
Figure 9:
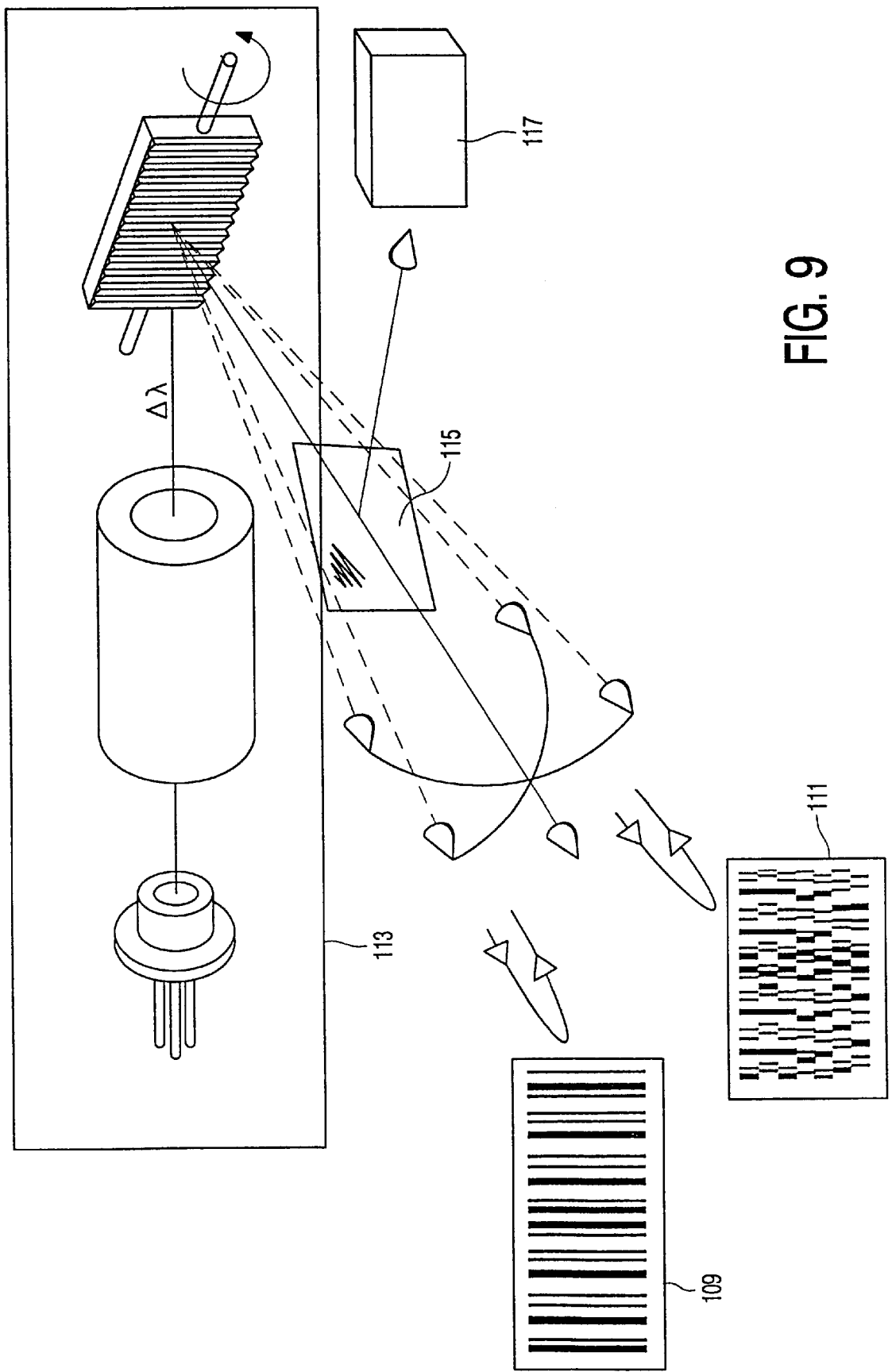

FIGS. 6(a) and 6(b) show a motorcar with a head-up display and an embodiment of the optical system with which the image is projected, the optical system being provided with an optical scanner according to the invention;

FIG. 7 shows an embodiment of a head-mounted display in which the display is written by means of a scanner according to the invention;

FIG. 8 shows an embodiment of a head-mounted display in which a scanner according to the invention is used for projecting the image on the retina; and FIG. 9 shows an embodiment of an apparatus for scanning a one-dimensional or multidimensional graphic code by means of a scanner according to the invention.

Figure 1:
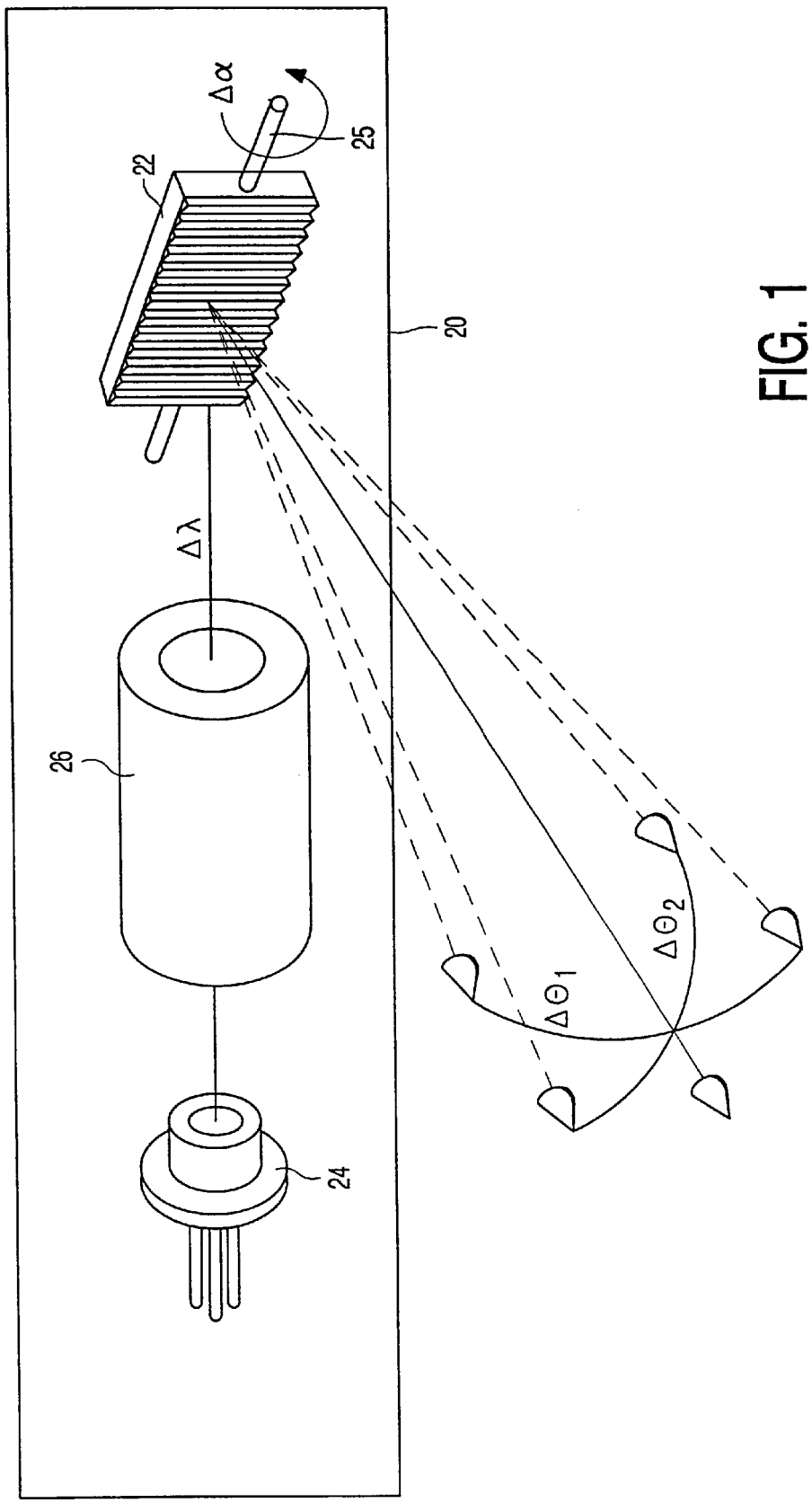
FIG. 1 illustrates how a two-dimensional scanning movement is realized in a scanner according to the invention.

FIG. 1 shows an optical scanner 20 according to the invention, with which a two-dimensional scanning movement is realized by means of a combined element 22. The radiation beam emitted by a radiation source 24, for example a diode laser, is transmitted to the element 22 via a wavelength-selective feedback element 26. By means of the wavelength-selective feedback element 26, a given wavelength is selected from the laser spectrum and sent to the laser 24 again so that it will subsequently generate radiation at this wavelength. A condition is that the light which has been fed back is coupled into the laser at the suitable moment and with a sufficient power. The wavelength-selective element 26 may be, for example an etalon or a switchable LCD mask in combination with a grating, so that the fedback wavelength is variable. For detailed information relating to said feedback, reference is made to U.S. Pat. No. 5,333,144 in the name of the applicant.

The first scanning movement of the beam through an angle $\Delta\theta_1$ is realized by rotating the element 22 about an axis 25 through an angle $\Delta\alpha$. In this case, for example $\Delta\theta_1 = \alpha 2\Delta\alpha$. The second scanning movement, for example in a direction perpendicular to the first scanning direction, is realized by means of wavelength modulation. In fact, different wavelengths are deflected at different angles by a grating. By causing a wavelength-varying beam to be incident on the grating, a scanning beam will be obtained whose angular range is indicated by $\Delta\theta_2$.

Figure 2:
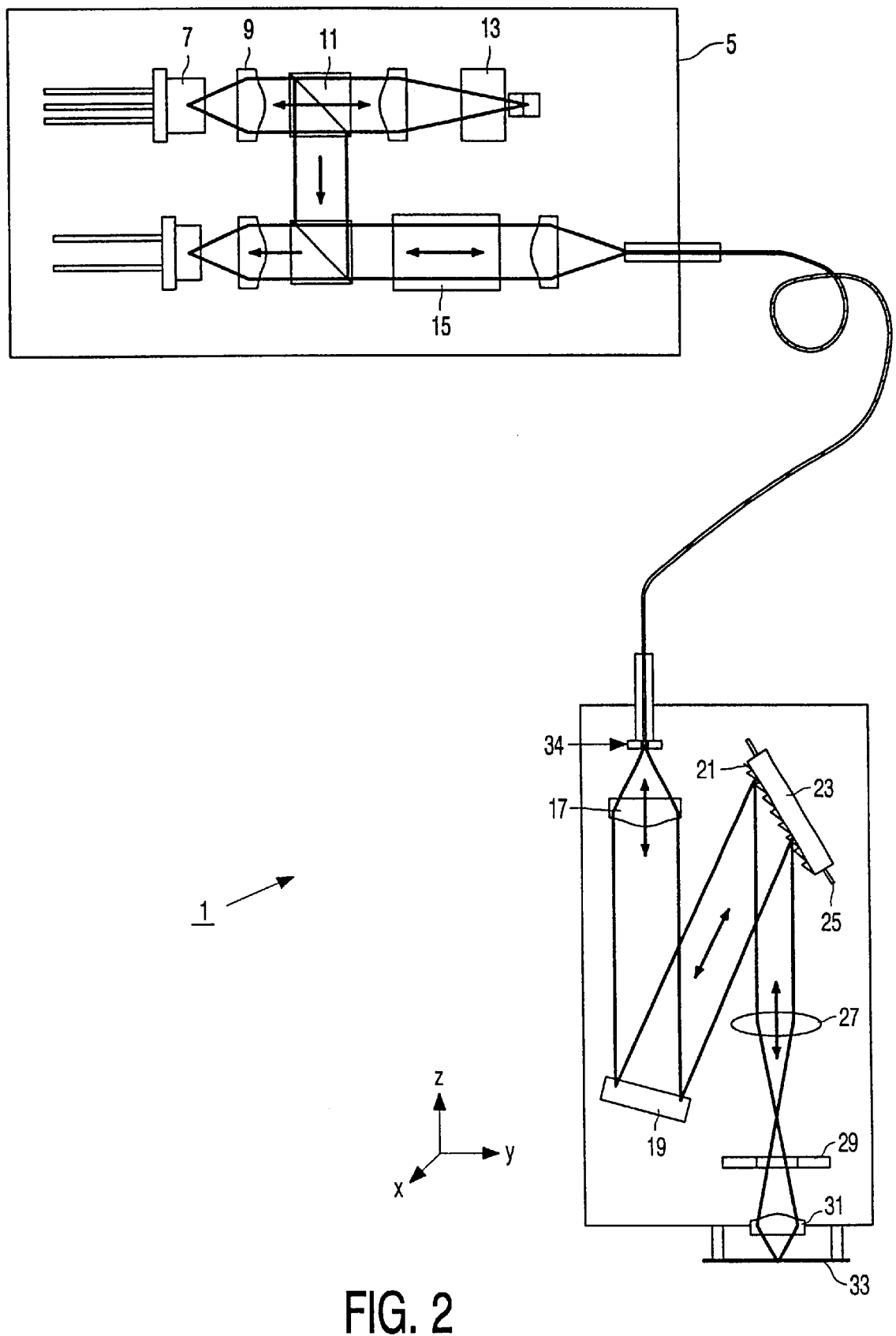
FIG. 2 shows an embodiment of an optical microscope with a scanner according to the invention, in which the rotating reflecting element and the wavelength selective element are integrated in a single element.

FIG. 2 shows diagrammatically an embodiment of an optical microscope 1 which is provided with a scanner according to the invention. The scanner comprises an optical system 5 within which the laser beam is generated. To this end, the optical system 5 comprises a laser 7, for example a diode laser, whose radiation is partly transmitted to a wavelength-selective feedback element 13 via a condensor lens 9 and a beam splitter 11. The laser beam generated in this way is corrected in the beam-shaping optical system 15 and is subsequently transmitted via an optical fiber to a compact measuring head accommodating the optical scanner.

The beam generated in the optical system 5 will now be subjected to a scanning movement. This is effected in the following manner in the present invention. The beam is incident via a lens 17 on a reflecting element 19 which folds the beam and sends it to a grating 21. A reflecting element 23 which may rotate about its axis 25 is integrated with the grating 21. In this way, a two-dimensional scanning movement of the laser beam is realized. In fact, by rotating the reflecting element, the beam will start scanning with respect to the plane of the drawing. In spite of this movement of the element 21, 23, the grating will not exert any influence on this scanning movement. The scanning movement in the second direction is obtained by varying the wavelength of the laser by means of the feedback element 13. In fact, a different wavelength will be deflected at a different angle by the grating 21. In this way, the laser beam will start scanning in the plane of the drawing. The two scanning movements are, for example, perpendicular to each other.

The laser beam scanning in two directions is subsequently incident via an eyepiece 27, a diaphragm 29 and an objective lens 31 on an object 33 to be scanned.

In the Figure, the grating 21 and the reflecting element 23 are integrated in a single element, but these may also be two separate elements. The advantage of an integrated element is that the number of separate components is reduced.

Depth information is obtained by means of a confocal detection technique in which spatial filtering takes place at the location of the arrow 34 by means of coupling into the optical fiber.

An important advantage of this scanner is that the wavelength scanning rate is not limited by inertia of a mechanical movement, so that scanning rates of several hundred kHz can be realized.

In addition to its use in an optical scanning microscope, the optical scanner described may also be used in several applications which will now be described.

A second application relates to optically addressable two-dimensional displays such as, for example, an LCD. The use of such a panel is described in, for example European patent application EP 0 517 517. A high light efficiency can be achieved with a display panel which can be written with radiation because it is not necessary to arrange a matrix of electronic switches and conducting electrodes on the panel surface and because this panel absorbs hardly any radiation.

Figure 3:
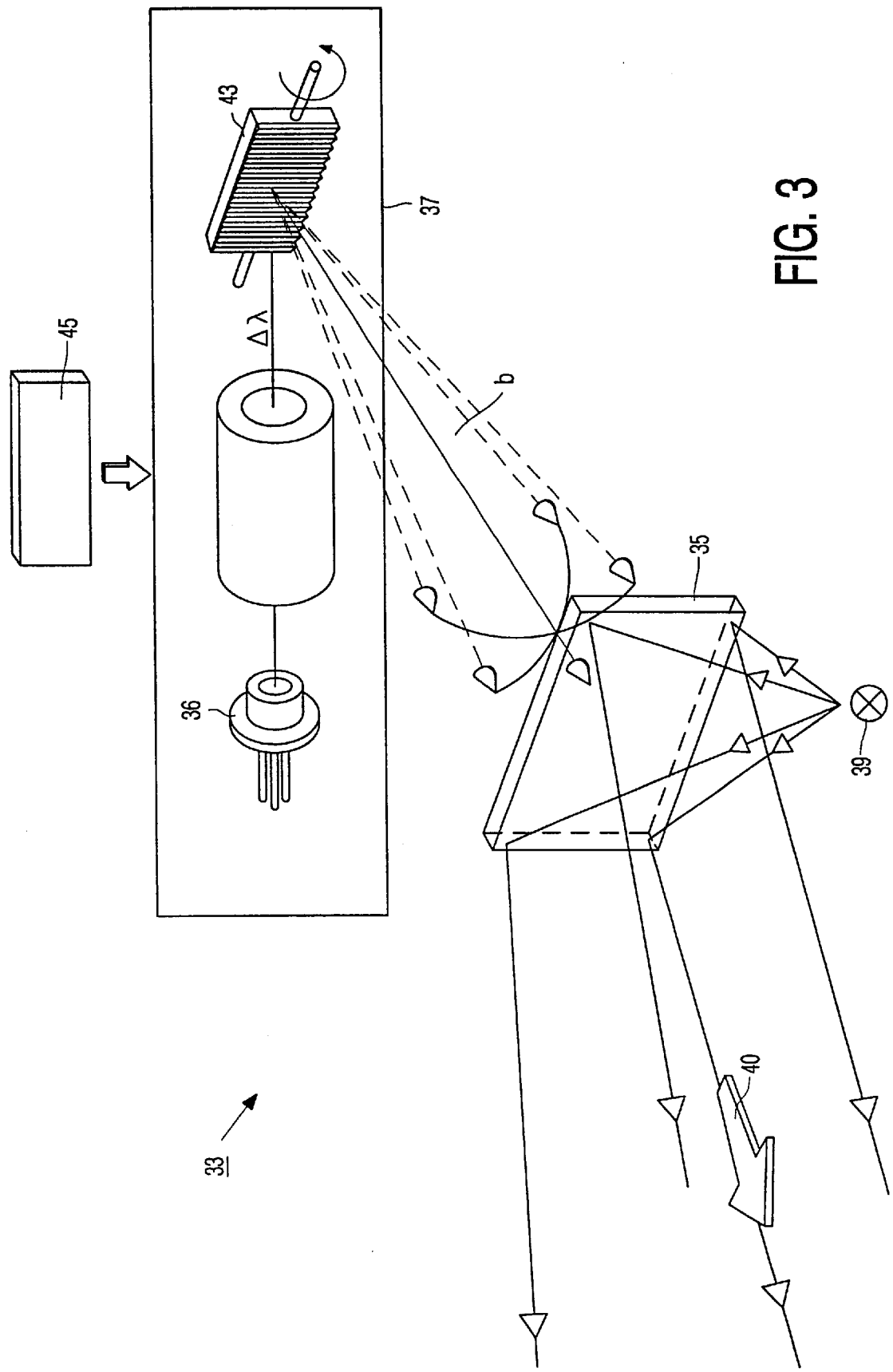
FIG. 3 shows an embodiment of an optical system for optically addressing a display in which a scanner according to the invention is used.

FIG. 3 shows an embodiment of an image projection apparatus 33 in which such a display panel 35 may be used. This apparatus is provided with an illumination unit 37 in the form of an optical scanner according to the invention. The illumination unit 37 thus comprises a radiation source 38, for example a diode laser, and supplies an illumination beam b which illuminates the panel 35. A panel as referred to in this case is line-sequentially scanned by means of a write beam emitted by the unit 37. The information to be displayed, for example a video signal, is supplied from, for example a receiver 45 so that the laser beam is intensity-modulated in accordance with this information. In known apparatuses, the laser beam is incident on a fast rotating mirror polygon and subsequently on a slower second scanning element which is constituted by, for example a vibrating plane mirror or by a second mirror polygon. The scanning element reflects the beam towards the panel. The mirror polygon reflects the converging beam in such a way that the radiation spot formed on the photosensitive layer of the panel describes a line. The second scanning element ensures a relatively slow movement of this radiation spot in a second direction perpendicular to the line direction. The photosensitive layer of the panel is thus scanned in two dimensions and a two-dimensional matrix of pixels is written. The use of a mirror polygon for scanning a display panel by means of a write beam is known from the English-language abstract of Japanese patent application 62-56931. The panel is illuminated on the other side by means of an illumination system represented, for the sake of simplicity, by a lamp 39. The light emitted by this lamp is reflected by the panel and imaged in the direction of the arrow 40 via a projection lens system (not shown) on a projection screen (not shown).

Instead of a mirror polygon as a scanning element, the unit 37 is provided in the present invention with an element 43 which comprises the combination of a grating and a rotating reflecting element. The wavelength scan is preferably used for the horizontal scan. A raster of pixels can be written by modulating the laser with the desired line signal during a line scan $\Delta\theta_1$ and by subsequently using the second scanning angle $\Delta\theta_2$ to write the next line. Here again, it is sufficient to use only a single rotation axis in combination with a wavelength scan and an optical raster.

Figure 4A:
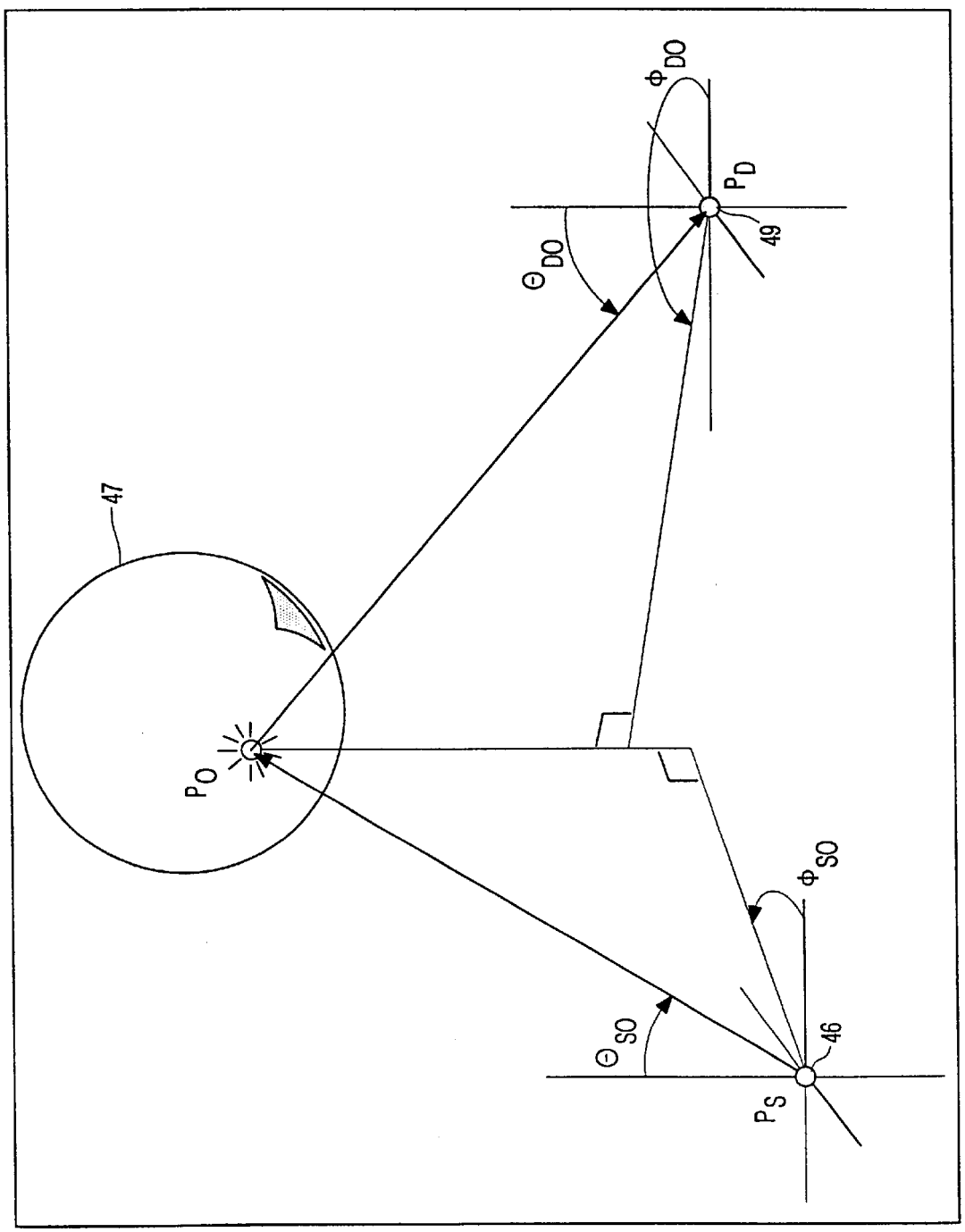
FIG. 4(a) illustrates the principle of the triangulation method.
Figure 4B:
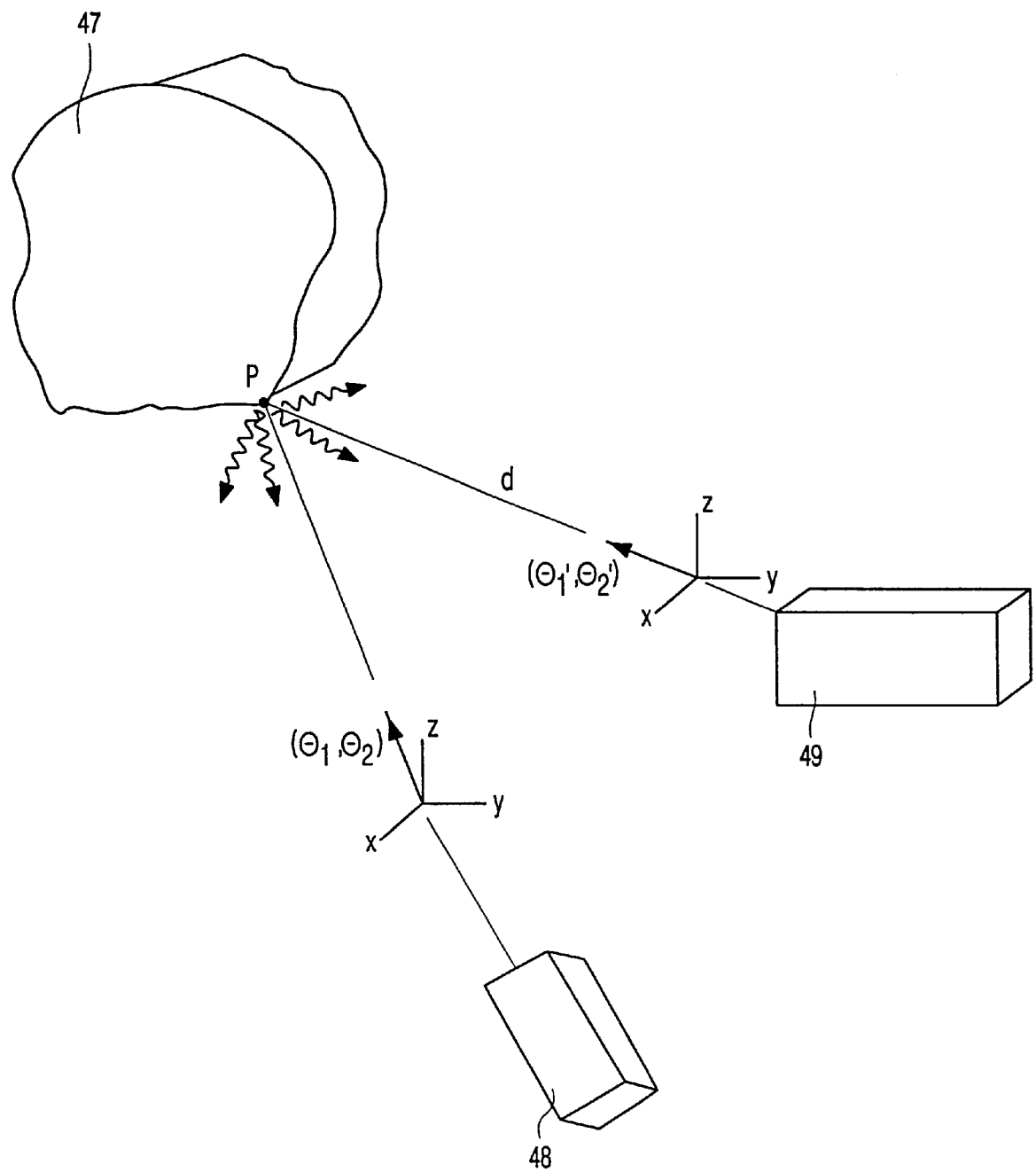
FIG. 4(b) shows an embodiment of a system with which this method can be performed, the system being provided with an optical scanner according to the invention.

A third application relates to scanning and recording (=prototyping) three-dimensional objects for CAD (Computer Aided Design) or prototyping applications. Prototyping is the process of computer-processing images of objects which are scanned to determine their shapes and dimensions. FIGS. 4(a) and 4(b) relate to this application. FIG. 4(a) illustrates the triangulation method which is known per se. The surface of a three-dimensional structure such as, for example, of the object 47, is scanned by means of a scanning laser beam emitted by a source 46. Subsequently, a two-dimensional detector 49, for example a lens with a CCD camera, determines the direction, with respect to the detector, of the position where the laser beam is incident on the object. For a given direction of the incident laser beam ($\theta_{SO}$, $\phi_{SO}$), the position of the tangent to the object, $P_O$, can be reconstructed by means of the source co-ordinates ($P_{SO}$, $\phi_{SO}$), and the detector co-ordinates ($P_D$, $\theta_{DO}$, $\phi_{DO}$). When the incident laser beam is two-dimensionally scanned through the angles $\theta_{SO}$ and $\phi_{DO}$, and the associated angle of the tangent $P_O$ ($\theta_{PO}$, $\phi_{PO}$) is determined for each setting ($\theta_{SO}$, $\phi_{SO}$), a set of three-dimensional co-ordinates is obtained which describe the surface of the object 47. For each measurement, the co-ordinates $P_S$, $P_D$, $\theta_{SO}$ and $\phi_{SO}$ are known magnitudes, while $\theta_{DO}$ and $\phi_{DO}$ are obtained from the measurement at detector 49.

The shape of the object can thus be obtained by means of a scan of both angles $\theta_{SO}$ and $\phi_{DO}$. This scan can be realized by means of the optical scanner described. FIG. 4(b) shows diagrammatically an embodiment of a set-up with which the above-mentioned method can be performed. The scanning light beam is supplied by a scanner 48 according to the invention. The scanner 48 is implemented similarly to the scanner shown in FIG. 1. The scan in the first direction is realized by a rotation about an axis, while the scan in the second direction is caused by the modulation of the wavelength of the laser light in combination with diffraction on a grating. In this way, an optical field can be scanned whose size is determined by the maximum wavelength modulation.

Extra information about the position of point $P_O$ can be obtained by making use of a pulsed laser. The extra information relates to the sum of the distances $P_S$–$P_O$ and $P_D$-$P_O$, which sum will be further referred to as d. The time T which is needed by a pulse reflected by the object to get from the source 46 to the detector 49 is directly related to the distance d and is given by T =d/c in which c is the velocity of light. This extra information may be used together with the results obtained from triangulation, as described above, to define a more precise position of point $P_O$.

Figure 5:
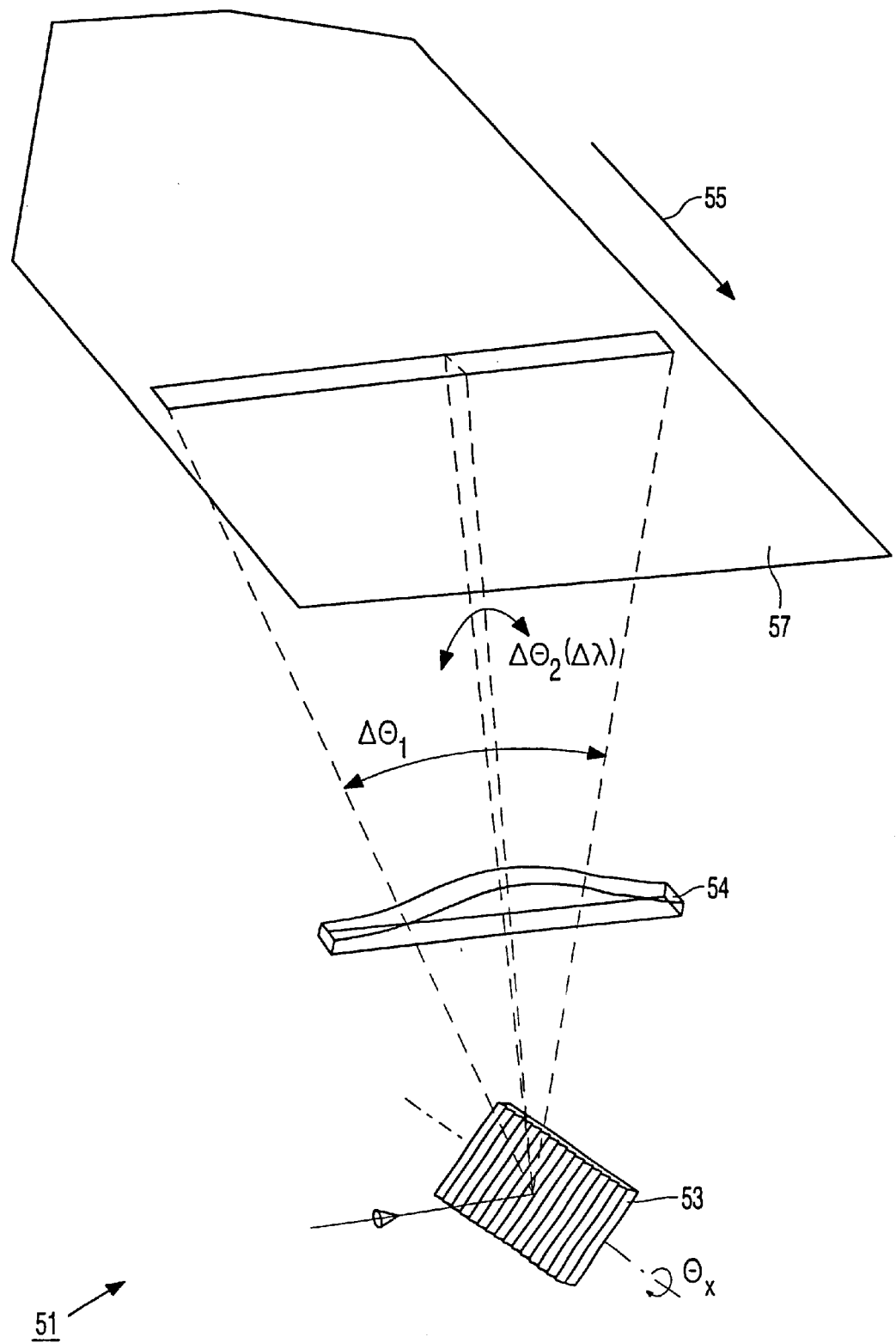
FIG. 5 shows an embodiment of a laser printer which is provided with an optical scanner according to the invention.

A fourth application relates to laser printers. An embodiment is shown in FIG. 5. In the laser printer 51 according to the invention, the laser beam is scanned by means of a rotating reflecting surface and a grating which are combined in a single element 53. The element 53 forms part of an optical scanner according to the invention, which is not completely shown in this Figure. A laser beam which is incident on the element 53 is intensity-modulated in accordance with the information to be printed. During one revolution of the mirror, one line is written. In the present invention, use is made of a second scan angle, the wavelength scan, so that more than one line can be written simultaneously upon one mirror revolution. In this way, the printing speed is raised considerably. The arrow 55 indicates the direction in which the paper 57 is transported. The scanning beam is incident on the paper 57 via scanning lens 54.

A fifth system in which a scanner according to the invention can be used to great advantage relates to head-up displays for automotive applications. To inform the driver, information can be projected, generally just above the hood. FIG. 6(a) diagrammatically shows where the image should be projected for the driver. The viewing direction differs very little from the normal viewing direction and the distance is, for example, approximately 3 meters so that the eye does not need to accommodate in the focal direction.

FIG. 6(b) shows an embodiment of the optical system 60 with which the projected image is generated. The image to be projected is supplied by the unit 62 which is implemented as an optical scanner according to the invention, as shown in FIG. 1, and to which the information to be projected is supplied. Via a lens 65 and two mirrors 67, 69, a two-dimensional image 73 is projected for the driver 71, as if the image were above the hood of the car.

A sixth application of the optical scanner according to the invention relates to head-mounted displays. Here, too, use may be made of a scanning laser beam for supplying the image information on the display. FIG. 7 shows a first embodiment. A two-dimensional image is generated by means of an optical scanner 75 according to the invention, to which the image information to be projected is supplied. The beam thus generated will scan in two dimensions with an intensity which is in conformity with the supplied image information. The generated two-dimensional image is split via two crossed half beam splitters 77, 79 into two image portions, one for each eye. Each of these image portions is incident on a concave mirror 81 which reflects and focuses the image. The reflected image is projected in an eyepiece-lens combination 87, 89 via a flat mirror 83, 85, one for each side, so that the image is collimated and projected for each eye in an exit pupil 91, 93. FIG. 8 shows a second embodiment of a head-mounted display, in which a video image can be projected on the user's retina by means of a compact, separate radiation source unit 95 and spectacles 97. The radiation source unit 95 is implemented in such a way that the beam supplied thereby is intensity-modulated in conformity with the image to be projected. Moreover, this beam is varied in wavelength. The beam is subsequently guided towards the sides of the user's face, for example, by means of an optical fiber 99, one for each eye. A parallel laser beam is projected on the "glasses" of the spectacles by means of a collimator which is present in the fiber. An element 101 is present in each of the "glasses" of the spectacles 95. The element 101 is partly reflecting so that the user can also look through it, and comprises a grating and is rotatable about an axis 103. The grating is preferably larger than the diameter of the incident beam. A part of the laser beam is reflected in the eye in the first or the second order of the grating and forms a point on the retina. The arrow 105 indicates the direction in which the projected image is sent to the retina. The wavelength scan and the dispersion of the grating ensure that this point on the retina describes a horizontal movement. By causing the element to oscillate thereon in a perpendicular direction, a two-dimensional image can be projected on the retina.

FIG. 9 shows an embodiment of an apparatus 107 for one-dimensionally or two-dimensionally reading a one or two-dimensional graphic code. Examples of such codes are a one-dimensional bar code 109 or a two-dimensional dot code 111. The two-dimensionally scanning beam required for this purpose is supplied by a scanner 113 according to the invention. The light path between the scanner 113 and the graphic code 109 or 111 comprises a partly transmissive mirror 115. This mirror 115 allows the beam from the scanner 113 to be partly transmitted into the direction of the code to be read, and allows the beam reflected by the graphic code to be partly transmitted into the direction of a detector 117. Detection of the reflected beam as a function of time supplies information about the read graphic code.

What is claimed is:

1. An optical scanner comprising a radiation source for generating a radiation beam, and means for giving the radiation beam a scanning movement in a first direction through an angular range $\Delta\theta_1$ and in a second direction through an angular range $\Delta\theta_2$, characterized in that the radiation source is tunable in wavelength, and the means comprise a grating and a rotating reflecting element.

2. An optical scanner as claimed in claim 1, characterized in that the reflecting element and the grating are integrated with each other.

3. An optical scanner as claimed in claim 1, characterized in that the laser is a pulsed diode laser.

4. An optical scanning microscope comprising an optical scanner as claimed in claim 1.

5. An optical system for addressing a two-dimensional display, comprising an optical scanner for supplying a scanning, intensity-modulated beam in conformity with information to be projected, a display to be addressed and an illumination system for illuminating the addressed display, characterized in that the optical scanner is implemented as claimed in claim 1.

6. An optical system for scanning and recording objects comprising an optical scanner for supplying a two-dimensionally scanning beam, and a detector, characterized in that the optical scanner is implemented as claimed in claim 1,.

7. A laser printer comprising an optical scanner as claimed in claim 1.

8. A head-up display system comprising an optical system for generating an image to be projected, characterized in that the optical system comprises an optical scanner as claimed in claim 1.

9. A head-mounted display, characterized in that the display comprises an optical scanner as claimed in claim 1, wherein the two-dimensionally scanning beam supplied by the scanner is intensity-modulated in conformity with the image to be projected.

10. An optical system for one or two-dimensionally reading a one or multi-dimensional graphic code, comprising an optical scanner for generating a two-dimensionally scanning beam, and a detector, characterized in that the optical scanner is implemented as claimed in claim 1.

11. The scanner of claim 1, wherein the first direction is a fast scanning direction;

the scanning in the first direction is effected by the grating, which is a diffraction grating;

the second direction is a slow scanning direction;

the scanning in the second direction is effected by the rotating reflector element 12. The scanner of claim 1, wherein the grating is a diffraction grating;

the diffraction grating and the rotating reflecting element are integrated in one rotating reflective grating element, the first angular range is in a plane perpendicular to the grating lines of the grating; and the second angular range is in a plane perpendicular to the axis of rotation of the element.

13. An optical scanner comprising a radiation source for generation a radiation beam, and means for giving tie radiation beam a scanning movement in a first direction through an angular range $\Delta\theta_1$ and in a second direction through an angular range $\Delta\theta_2$, characterized in that the radiation source is tunable in wavelength, and tie means comprise a grating and a rotating reflecting element, characterized in that the reflecting element and the grating are integrated with each other, and further comprising a wavelength tuner coupled to received radiation from the source and tune the radiation from the source to a plurality of wavelengths; and wherein the grating achieves either the first or second direction of scanning, by interaction with tuned radiation received from the tuner.

* * * * *